INVENTORS
JAMES G. BRENZA
ARTHUR A. KUSNICK
BY Ronald L. Kronsolory
AGENT

Nov. 25, 1969 J. G. BRENZA ET AL 3,480,910

PULSE VALVE DETERMINING RECEIVER

Filed Nov. 4, 1963 8 Sheets-Sheet 6

United States Patent Office 3,480,910

Patented Nov. 25, 1969

3,480,910

PULSE VALUE DETERMINING RECEIVER

James G. Brenza, Putnam Valley, and Arthur A. Kusnick, Peekskill, N.Y., assignors to International Business Machines Corporation, New York, N.Y., a corporation of New York Filed Nov. 4, 1963, Ser. No. 321,227
Int. Cl. G08b *29/00;* H03k *17/00*
U.S. Cl. 340—146.1 6 Claims This invention relates to data receivers and more particularly to a data receiver which is capable of determining the proper value for data pulses received from a noisy transmission line and of properly determining the value of each pulse in a train of data pulses, even when the clocks at the transmitter and receiver are out of synchronism.

Two of the principle causes of data loss, when data pulses are being transmitted from one remote point to another, are noise on the transmission line or other transmission media and the lack or loss of synchronism between the clocks at the transmitter and receiver. This latter problem may result either from the clocks not initially being synchronized or from one of the clocks running at a faster rate than the other.

While every effort is made to minimize the noise in the transmission media, it is virtually impossible to eliminate all noise and it is extremely expensive to try. A more acceptable solution to the noise problem is to provide a device at the receiver for distinguishing the data from the noise and for assigning the proper value to the data pulse in spite of noise signals which may be superimposed on it. This device should, of course, be as simple and inexpensive as possible.

The initial synchronizing of the clocks at the transmitter and receiver has often been handled by transmitting some sort of an initial code sequence to permit the clocks to be synchronized. The data is often interrupted at predetermined intervals to allow the transmission of additional code sequences to maintain the clocks in synchronism. An alternative solution has been to provide an additional transmission line, over which clock pulses are transmitted. To set and maintain the clocks running at the same rate, relatively expensive motors or servo-systems have been employed at either the transmitter or receiver. A preferable solution to the variable-rate problem would be a simple inexpensive device at the receiver which is capable of detecting the beginning of a data pulse and of using this information to maintain a form of synchronism which permits the proper determination of data values without requiring the actual readjustment of the clocks.

It is therefore an object of this invention to provide a device at a data-pulse receiver which is capable of properly determining the value of a data pulse in spite of a relatively large amount of noise on the transmission media.

Another object of this invention is to provide a relatively simple and inexpensive device of the type described above.

A further object of this invention is to provide a device at the receiver of a data transmission system which properly determines the value of the data pulses even if the clocks at the transmitter and receiver are out of synchronism.

A still further object of this invention is to provide a device which maintains a form of synchronism in a data transmission system without requiring either the clock at the transmitter or the clock at the receiver to be adjusted.

Another object of this invention is to provide a device for obtaining and maintaining a degree of synchronism between the transmitter and receiver clocks without requiring the transmission of special synchronization data.

Still another object of this invention is to provide a cheap and simple way of operating a data transmission system without error when the clocks at the transmitter and receiver are out of synchronism.

In accordance with these objects, this invention provides a means for attempting to sample each data pulse a predetermined number of times, generally an odd number of times $(2n+1)$. The value of $(n+1)$ of the samples is assumed to be that of the pulse. Therefore, so long as there is more data than noise, a proper determination is made. A counter is also provided for counting the number of consecutive like samples. When $(n+1)$ consecutive like samples of a value different from the value indicated for the previous data pulse are counted immediately following the setting of an indicating device for the preceding data pulse, it is assumed that these consecutive samples represent the beginning of a new data pulse and the circuit is adjusted accordingly. The value of the $(n+1)$ consecutive like samples is stored as that of the new data pulse.

The foregoing and other objects, features and advantages of the invention will be apparent from the following more particular description of a preferred embodiment of the invention, as illustrated in the accompanying drawings.

Figures 2, 2A:
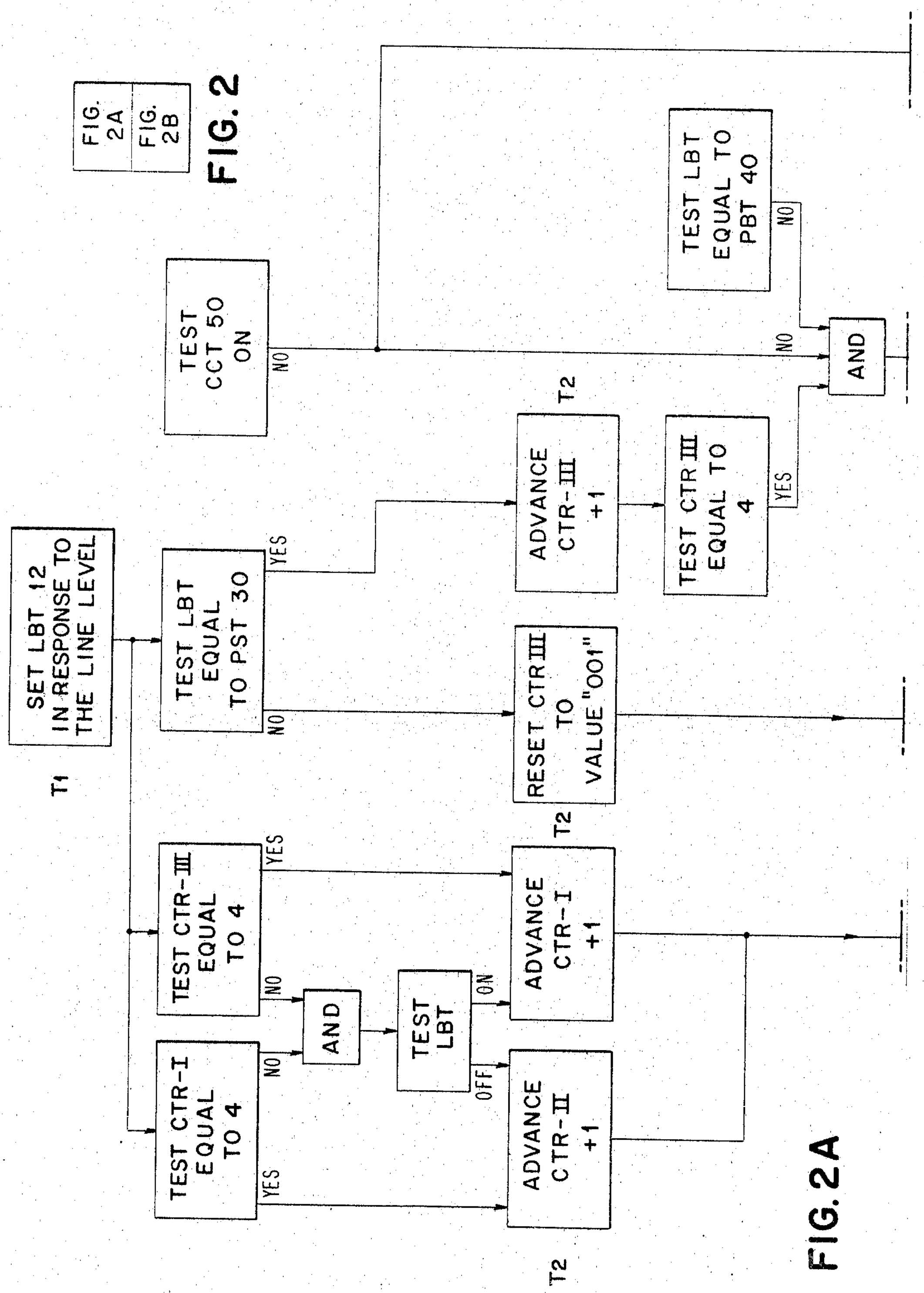
FIG. 2 is a chart illustrating how
FIGS. 2A–2B are combined to form a flow diagram illustrating the logic of the device of this invention.
Figure 2B:
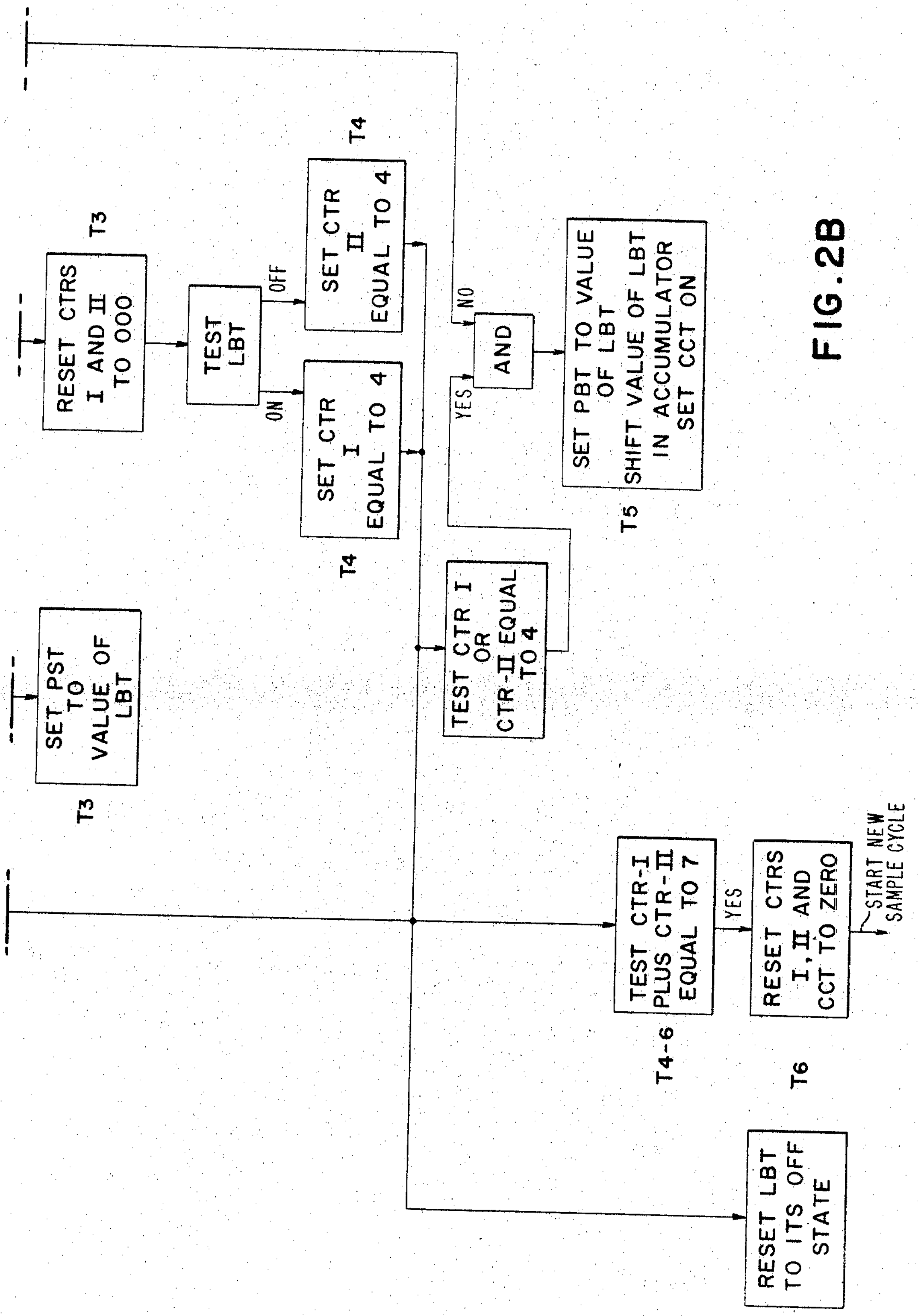

FIGS. 2A–2B, when taken together, form a flow diagram illustrating the logic of the device of this invention.

Figure 3A:
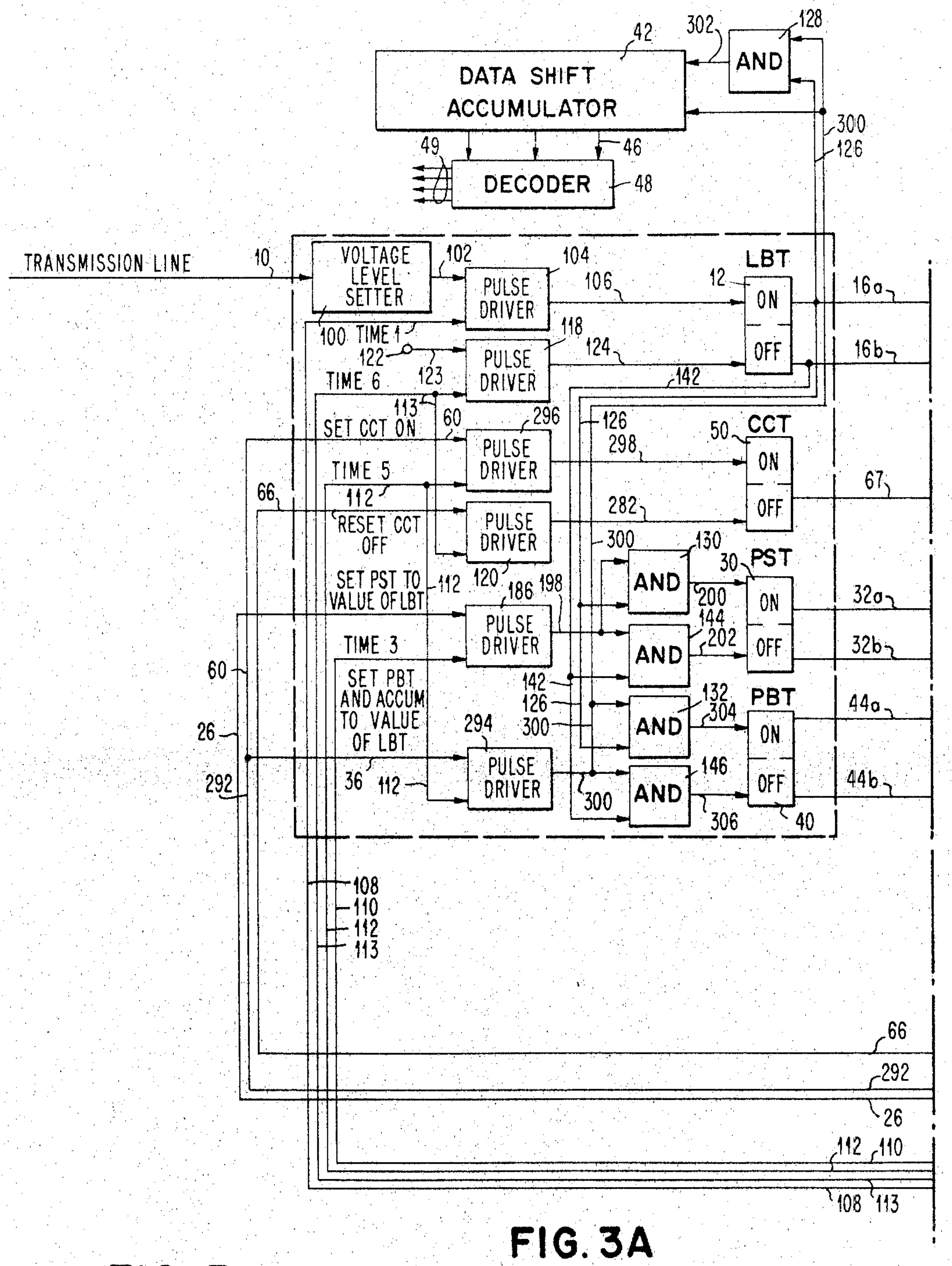
Figure 3:
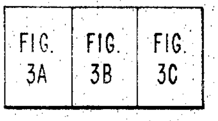
Figure 3B:
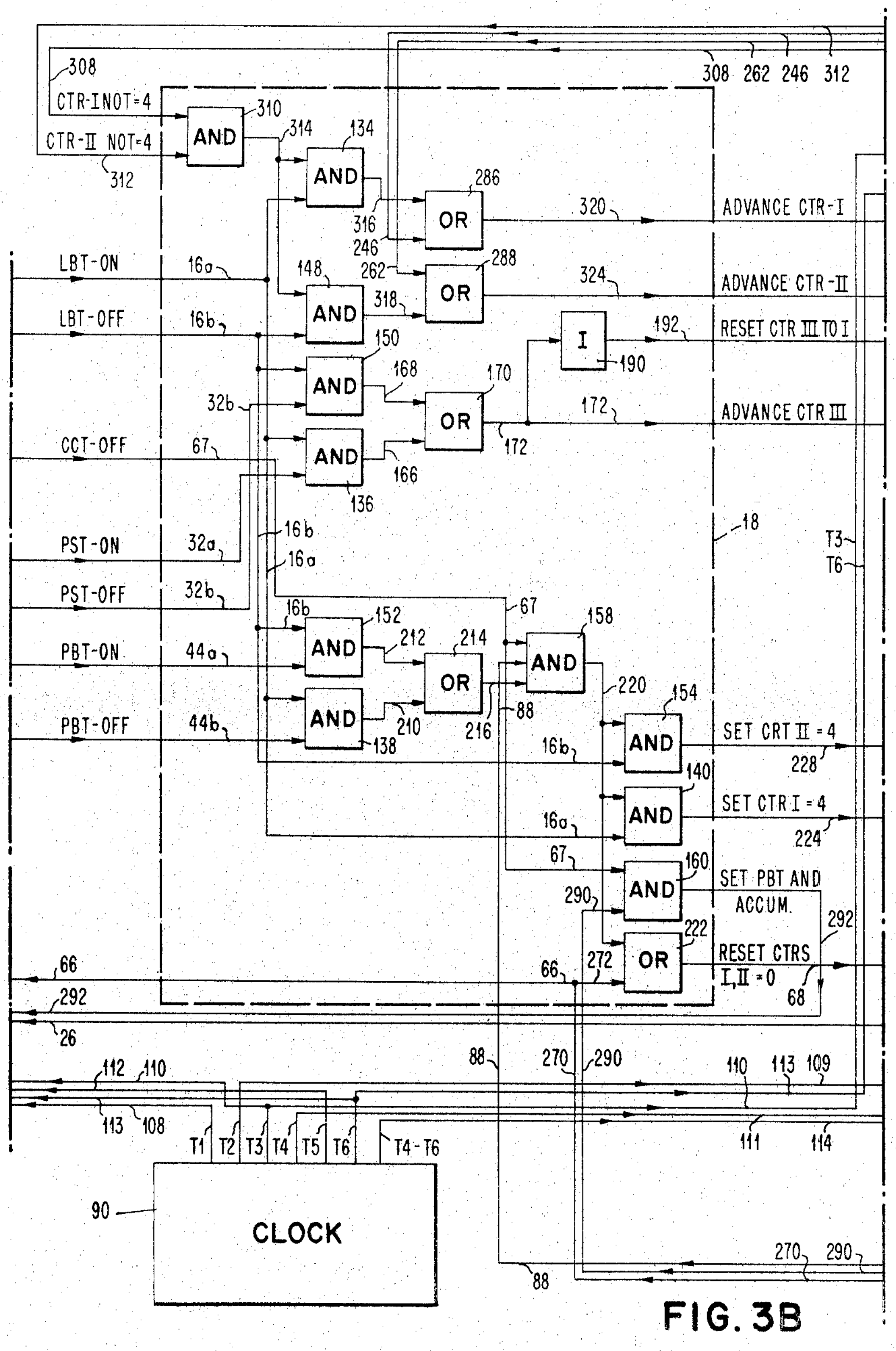
Figure 3C:
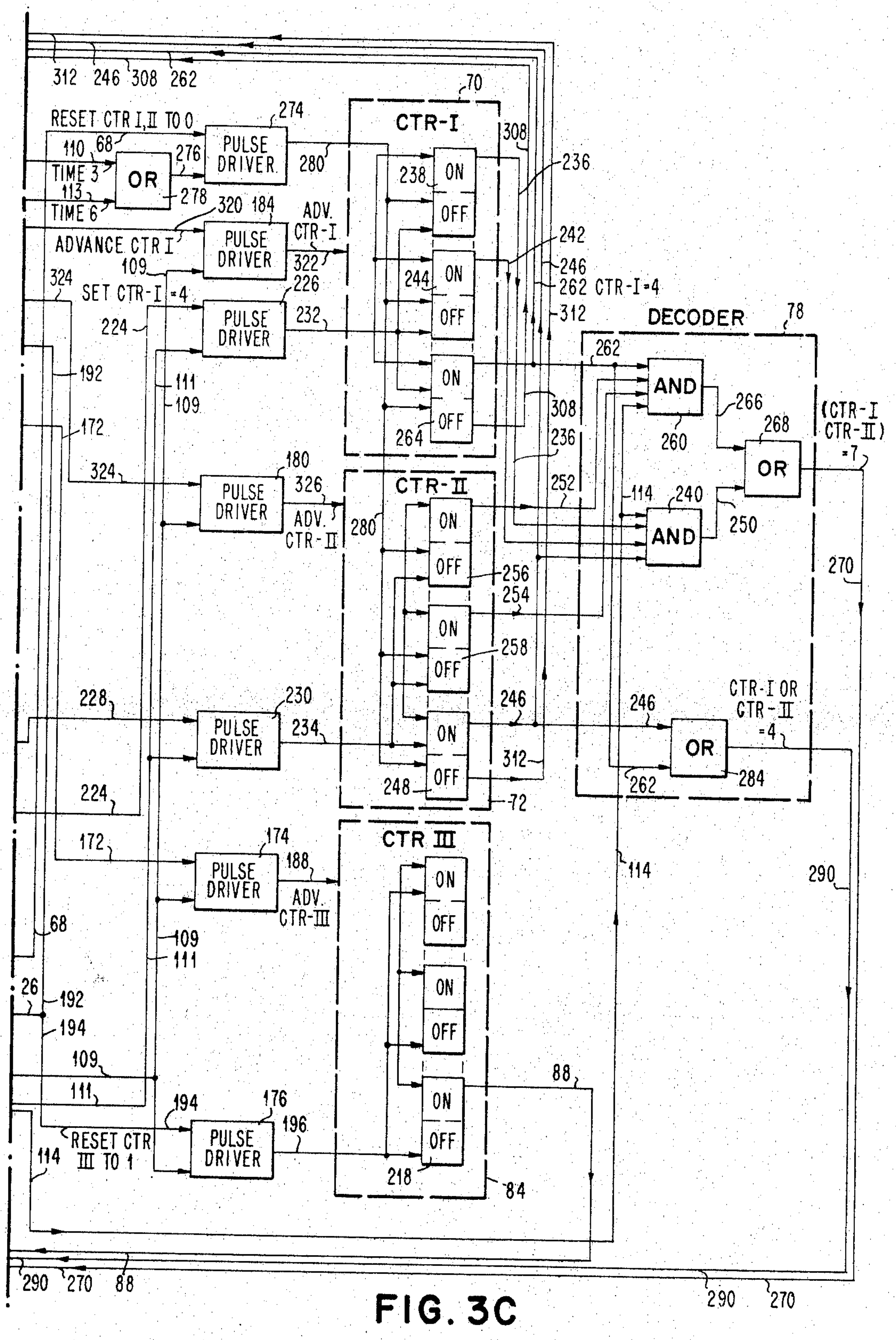

FIG. 3 is a chart illustrating how FIGS. 3A–3C are combined to form a detailed block diagram of a preferred embodiment of the device of this invention.

FIGS. 3A–3C when taken together, form a detailed schematic block diagram of a preferred embodiment of the device of this invention.

Figure 1:
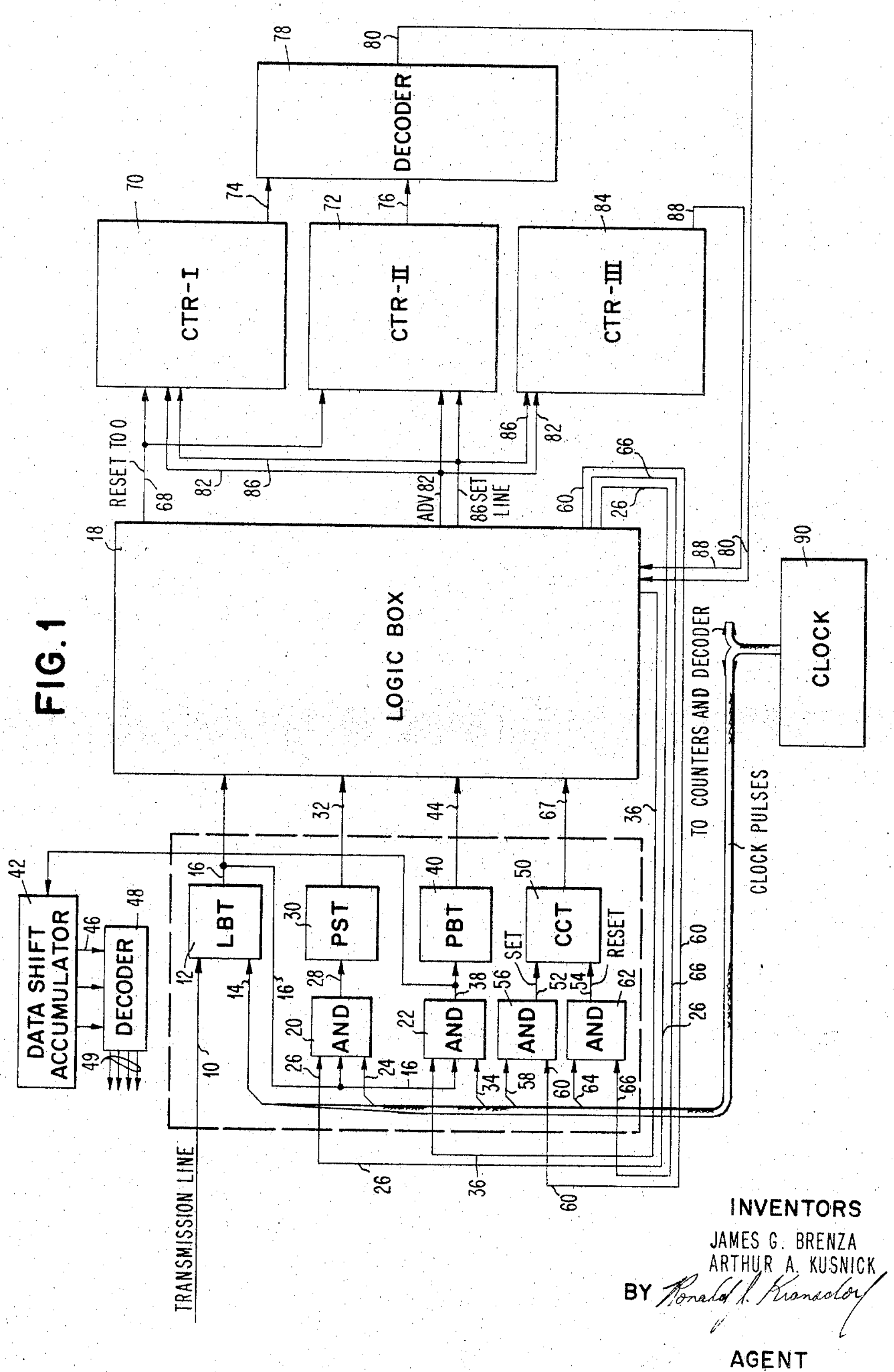
FIG. 1 is a general block diagram of the system of this invention.
Figure 4:
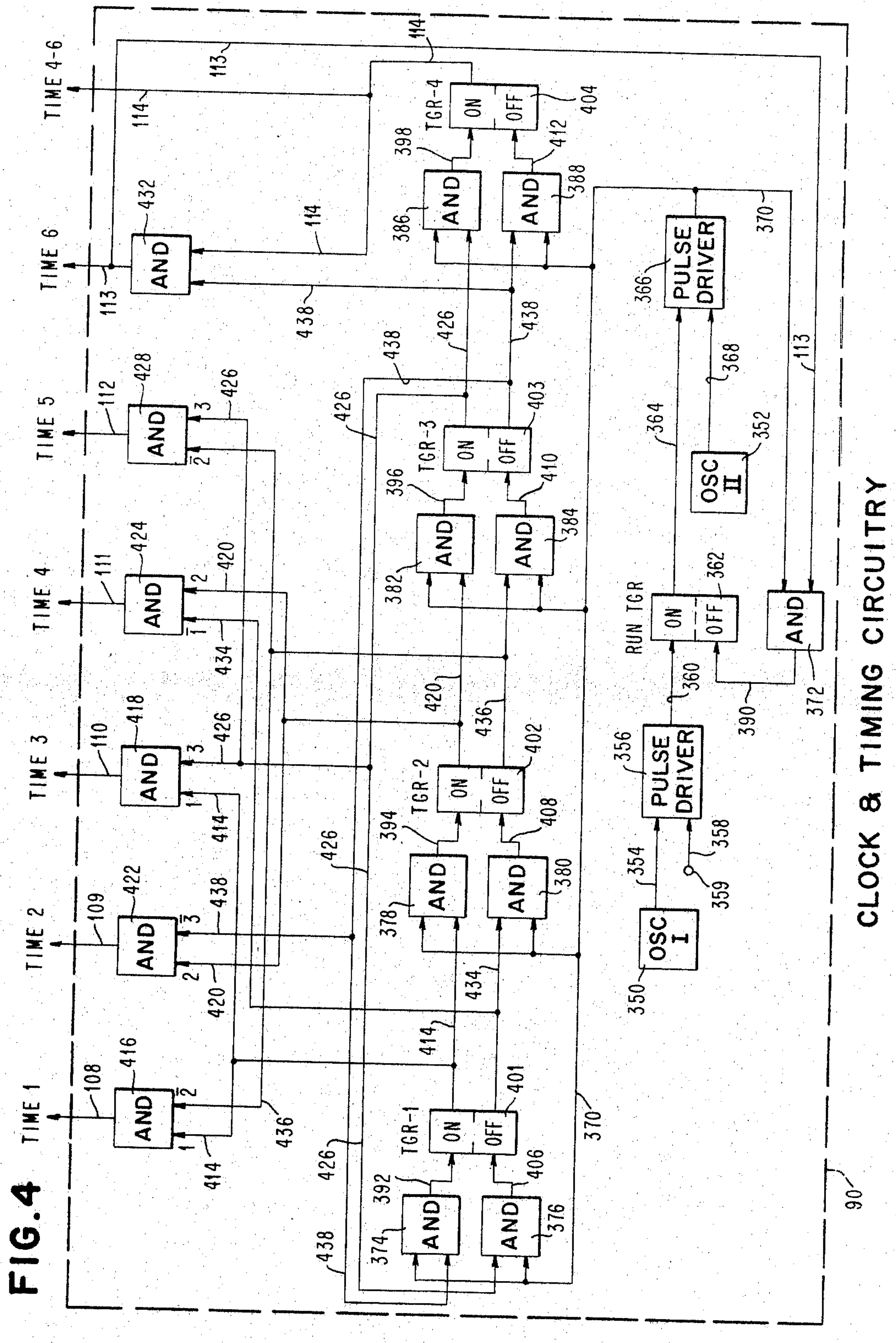

FIG. 4 is a schematic block diagram of a clock circuit suitable for use as the clock shown in FIGS. 1 and 3B.

Figure 5:
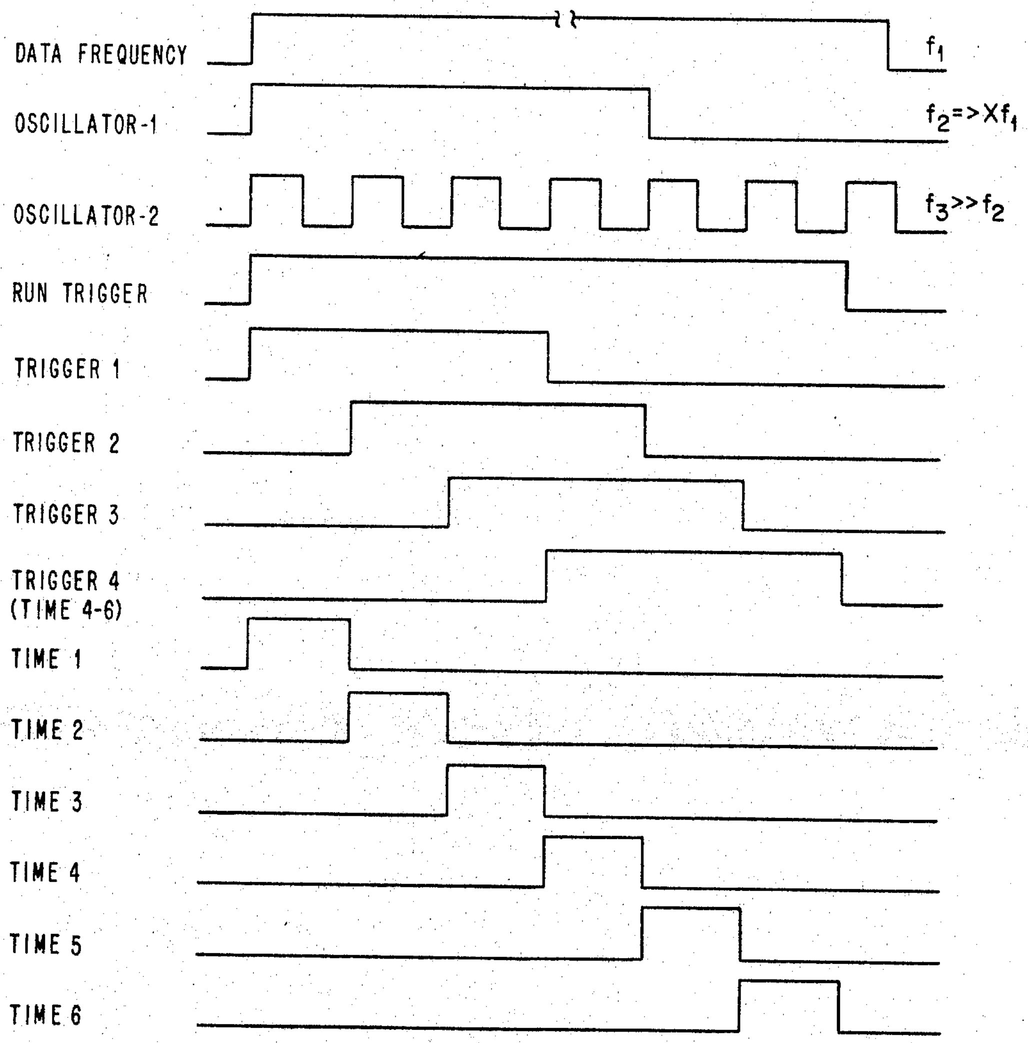

FIG. 5 is a timing chart showing the outputs from the various elements in the clock circuit shown in FIG. 4.

Figure 6:
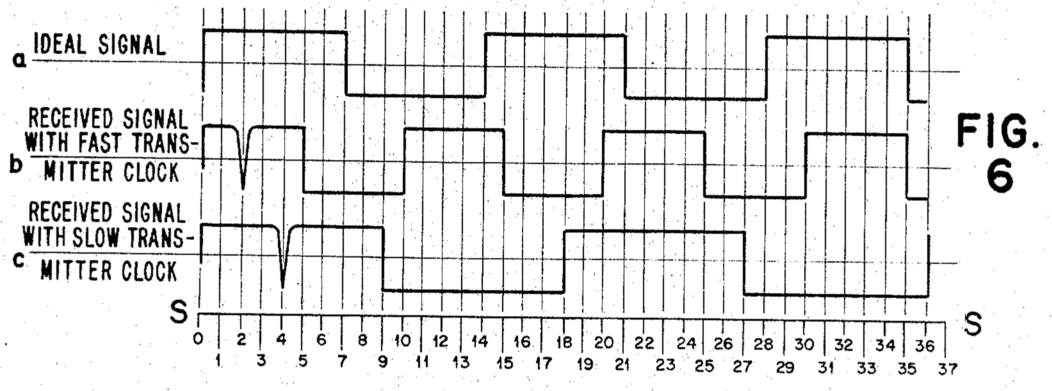

FIG. 6 is a chart used in illustrating the operation of the circuit shown in FIG. 1 and FIGS. 3A–3C.

GENERAL DESCRIPTION

Referring now to FIG. 1, it is seen that input data pulses on transmission line 10 are applied as the set input to line bit trigger (LBT) 12. If the pulse level on transmission line 10 is up, LBT 12 is set its ON state and if the pulse level on transmission line 10 is down, LBT 12 is set to its OFF state. LBT 12 is reset to its OFF state by a clock pulse applied to line 14 by clock 90 at a suitable time in the sampling cycle. The time at which this clock pulse is applied and the manner of its application will be described later. Output line 16 from LBT 12 is connected as one input to a logic box 18, and as the information input to AND gates 20 and 22. Signals on line 16 indicate the state of LBT 12. Logic box 18 is a gating circuit which generates outputs on one or more of its output lines in response to the detection of various predetermined settings of the circuit triggers and counters, these settings being applied as inputs to the box. Suitable gating circuitry for this purpose is shown in FIG. 3B and described later.

One conditioning input to AND gate 20 is a clock pulse from clock 90 on line 24 and the other conditioning input to this AND gate is output line 26 from logic box 18. Output line 28 from AND gate 20 is applied to set past sample trigger (PST) 30 to the setting of LBT 12. Output line 32 from PST 30 is connected as a second input to logic box 18.

One conditioning input to AND gate 22 is a clock pulse from clock 90 on line 34. The other conditioning input to this AND gate is output line 36 from logic box 18. Output line 38 from AND gate 22 is connected as the set input to past bit trigger (PBT) 40 and as the set and shift input to accumulator 42. Therefore, when AND gate 22 is fully conditioned, the contents of LBT 12 is set into PBT 40 and into the first position of accumulator 42, and the remaining bits in accumulator 42 are shifted left one position. Accumulator 42 is a standard, n-position shift register. Output line 44 from PBT 40 is connected as a third input to logic box 18. The contents of accumulator 42 are applied through lines 46 to a decoder 48. Decoder 48 is connected to recognize the various characters which may be assembled in accumulator 42 and to generate output signals on lines 49 indicating what these characters are.

A fourth trigger in the circuit is cycle control trigger (CCT) 50. This trigger is set to its ON state by a signal applied to line 52 and is reset to its OFF state by a signal on line 54. Line 52 is the output line from AND gate 56, the inputs to this AND gate being clock pulse line 58 and output line 60 from logic box 18. Reset line 54 is the output line from AND gate 62, the inputs to this AND gate being clock pulse line 64 and output line 66 from logic box 18. Output line 67 from the OFF side of CCT 50 is connected as a fourth input to logic box 18.

Output line 68 from logic box 18 is the reset-to-ZERO-line for counter I, also designated 70 and counter II, also designated 72. Counter I counts the number of UP samples obtained during a sampling cycle, while counter II counts the number of DOWN samples obtained during the same sampling cycle. Output lines 74 and 76 from counters I and II respectively, are connected through decoder 78 and line 80 as a fifth input to logic box 18. Decoder 78 is a gating circuit which generates outputs in response to predetermined counts in conuters I and II. A suitable decoder is shown in FIG. 3C and described later. Output line 82 from logic box 18 is the advance line for counter I, 70, counter II, 72 and counter III, 84. Counter III counts the number of consecutive like samples which are taken of the signal on transmission line 10. A signal is applied to line 82 to increment the proper one or more of the counters after each sampling of the input pulse stored in LBT 12. Output line 86 from logic box 18 is the set line for counters 70, 72 and 84. A signal applied to this line cause either counter 70 or 72 to be set to a count of 4 or causes counter III to be set to a count of 1. Output line 88 from counter III is connected as the final input to logic box 18. A signal on line 88 means that counter III has a count of 4 therein.

The various clock pulses used to control the setting of the circuit triggers and counters are generated by clock circuit 90. This clock circuit generates six independent clock pulses and one clock pulse which lasts for three of the independent clock pulses during each sampling cycle, there being seven sampling cycles for each data pulse cycle. A data pulse cycle has a duration equal to the duration of a normal data pulse. A suitable circuit for generating the required clock pulses is shown in FIG. 4 and described later.

GENERAL OPERATION

FIGS. 2A–2B form a logical flow diagram illustrating how the circuit shown in FIG. 1 operates to determine the value of a binary input pulse and how the circuit maintains the ability to recognize these input pulses even when the clocks at the transmitter and receiver are out of phase with each other. The sequence of operations shown in FIGS. 2A–2B occur during a single sampling cycle, there being seven such sample cycles for each normal data pulse. The duration of a normal data pulse is subsequently referred to as a data pulse cycle.

Referring now to FIGS. 1 and 2A together, it is seen that the first timing pulse from clock 90 is used to gate the pulse level on line 10 into LBT 12. Therefore, at the beginning of each sampling cycle, LBT 12 is set in response to the instantaneous value of the signal on transmission line 10. If the line level is up, LBT 12 is set to its ON state while if the line level is down, LBT 12 is left in its OFF state. Between timing pulses 1 and 2, logic circuit 18 is performing a variety of tests. Referring first to the loop on the left side of FIG. 2A, it is seen that the logic circuit is testing to determine if either counter I or counter II has a count of 4 therein. As will be seen later, if either of these counters has a count of 4, the value of the data pulse has already been determined and the remaining samples are merely being taken to complete the data pulse cycle. The logic box recognizes the end of a data pulse cycle when the sum of the counts in counters I and II is equal to 7. To simplify the recognition circuitry required, a 7 is recognized only if one counter has a count of 4 stored therein and the other counter, a count of 3. Therefore, in referring back to the left-hand loop in FIG. 2A, it should be remembered that if a count of 4 is in one of the counters, the value of the data pulse has already been determined and that, if either counter I or counter II has a count of more than 4 therein, the end-of-data-pulse-cycle-recognition circuit will not operate. Counter II is therefore advanced by 1 at T2 time if counter I has a count of 4 therein, indicating that the value of the data pulse on line 10 is an UP level. Similarly, an advance pulse is applied to counter I at T2 time if counter II has a count of 4 therein, indicating that the value of the data pulse is a DOWN level. If neither counter I nor counter II has a count of 4 stored therein, then the value of the data pulse being sampled has not yet been determined and, at T2 time, counter I is incremented if LBT 12 is set to its ON state and counter II is incremented if LBT 12 is set to its OFF state.

At the same time that the above tests are being performed, logic box 18 is also testing to determine whether the setting of LBT 12 is equal to the setting of past sample trigger (PST) 30. If the past sample and the present sample are the same (i.e., if the contents of PST and LBT are equal), then, at T2 time, counter III is incremented by one. If, on the other hand, the present sample and the past sample are different, (i.e., LBT and PST are not equal), then, at T2 time, counter III is reset to a count of 1. Also, if LBT and PST are not equal, at T3 time a signal is applied to line 26, fully conditioning AND gate 20 to allow PST to be set to the value of LBT. The effect of the two operations just described is to indicate that there has been one consecutive sample of the value now stored in PST (the value of the sample just taken).

Referring back to the "yes" output leg from the "test LBT equal to PST" block, it is seen that after advancing counter III at T2 time, logic box 18 then tests to see whether counter III has a count of 4. If counter III does at this time have a count of 4 therein, CCT 50 is in its OFF state, and LBT is detected as not being equal to PBT, then, at T3 time, a signal is generated by logic box 18 on line 68 to reset counters I and II to a count of 0. After counters I and II have been reset to a count of 0, a test is made of the state of LBT 12, and, if this trigger is in its ON state, at T4 time a count of 4 is set into counter I, while, if LBT is in its OFF state, at T4 time a count of 4 is set into counter II.

The above described operations are the ones which permit the circuit to properly identify the value of input data pulses even when the transmitter and receiver clocks are out of phase with each other. It will be seen that at the end of each data pulse cycle, counters I and II are reset to 0. Therefore, if the transmitter clock is running faster than the receiver clock (the receiver clock being the reference clock) so that part of a second data pulse is being received during the data pulse cycle of the preceding data pulse, one or more of the later samples of the preceding data pulse cycle actually are taken on the new data pulse. These samples are lost when counters I and II are reset. However, counter III detects the number of consecutive samples of a given value and is not reset at the end of a data pulse cycle. Therefore, if the one or more samples taken of the new data pulse during the preceding data pulse cycle are the same and the first few samples during the new pulse's own sampling cycle are the same as those taken during the preceding sampling pulse cycle, then counter III indicates that four consecutive samples of the same value have been obtained. If the previous bit is the same as the new bit, then this test has no significance since all samples are the same. Therefore, this test is made only when the new bit and the previous bit sampled are different; therefore, one necessary condition for this test is that LBT be different from PBT. Also, if counter I or counter II is equal to 4, the value of the new data pulse has already been determined by the normal means provided by the circuit, and the need for the above procedure does not exist. Therefore, this test is made only when CCT, the trigger which is set when either counter I or counter II is equal to 4, is in its OFF state.

When the proper conditions exist, the circuit resets counters I and II to 0, and then sets a count of 4 into the counter representing the value then stored in LBT. This effectively forces the circuit into synchronism by assuming that the first sample of the consecutive samples detected by counter III is the first sample for a new data pulse.

Between T4 and T5 time, logic box 18 tests to see whether counter I or counter II has a count of 4 in it. If one of these counters has previously been detected to have a 4 in it during the same data pulse cycle, then CCT 50 is in its ON state and, since the three operations indicated as being performed at T5 time have already been performed, there is no need to perform them again. Therefore, at T5 time, the three operations are performed only if CCT 50 is in its OFF state and either counter I or counter II has a count of 4 therein. To perform the first operation, a signal appears on line 36 (FIG. 1) fully conditioning AND gate 22 to generate an output signal on line 38 which sets the value of LBT 12 into PBT 40. The signal on line 38 also sets the value in LBT 12 into accumulator 42 and causes the remaining data in the accumulator to be shifted right one position. Finally, logic box 18 generates an output signal on line 60 which fully conditions AND gate 56 to generate an output signal on line 52 to set CCT 50 to its ON state. The above operations are performed regardless of how a count of 4 is set into counters I and II. In other words, these operations are performed whether the counter is incremented to 4 by successive advance signals on line 82 or whether the counter is set to 4 by a signal on line 86 as a result of a count of 4 being detected in counter III.

The last test to be performed in each sample cycle occurs between T4 and T6 time when the sum of counters I and II is applied to logic box 18 through line 80 from decoder 78 and a determination is made as to whether the sum is equal to 7. If this sum is equal to 7, then at T6 time a signal is generated on line 68 (FIG. 1) to reset counters I and II to 0 and a signal is generated on line 66 fully conditioning AND gate 62 to generate a reset signal on line 54 to reset CCT 50 to its OFF state. The above sequence of operations ends the data pulse cycle for one pulse and cause the data pulse cycle for the next pulse to begin.

At T6 time of each sample pulse cycle, clock 90 (FIG. 1) applies a timing pulse to line 14 to reset LBT 12 to it OFF state.

To further illustrate the operation of the circuit shown in FIG. 1, assume that with the transmitter and receiver clocks synchronized and with no noise on the line, the received signal would be that shown on line *a* of FIG. 6. Assume further that the transmitter clock is running at a faster rate than the receiver clock and that there is noise on the line so that the received signal is that shown on line *b* of FIG. 6.

It is assumed that a sample taken at a pulse transition causes LBT 12 to be set to the value of the pulse which is being terminated. Therefore, the first sample taken of the first pulse shown in FIG. 6 is taken at S1 time.

In the following discussion, the term S*i* time refers to the time for the $i^{th}$ sample cycle, there being seven sample cycles for each normal data pulse cycle and T*i* time refers to the time at which the clock pulse *i* from clock 90 is generated during a sample cycle. There are 6 T*i* times for each S*i* time.

At S1 time, there is an UP level on transmission line 10. Therefore, LBT 12 is set to its ON state at T1 time. Assuming that at the beginning of the S1 sample cycle all triggers are in their OFF state and all counters in their reset condition, all of the tests performed prior to T2 time (FIG. 2A) of S1 sample time give negative results. Therefore, at T2 time, counter I is incremented by 1 and counter III is reset to a value of 1. At T3 time, there is a signal on line 26 conditioning AND gate 20 to set PST to the value of LBT (i.e., to its ON state). Nothing further happens during the S1 sample cycle until after T4 time when a test is made to see whether counter I or counter II has a count of 4. Since neither of these counters has a count of 4, and since the sum of the counts in them is not equal to 7, nothing further happens during the S1 cycle until T6 time when clock 90 applies a signal to line 14 to reset LBT to its OFF state. Since LBT is reset to its OFF state at T6 time of each sample cycle, this operation will be assumed to occur and will not be specifically mentioned again in this section.

A noise spike now occurs, causing the sample at S2 time to encounter a down level. LBT 12 is therefore left to its OFF state at the beginning of this sample cycle. Again, neither counter I nor counter II has a count of 4, so that the counter corresponding to the setting of LBT 12 is advanced. In this case, it is counter II which is incremented to a count of 1. Since the past sample was an UP level and the present sample is a DOWN level, the setting of LBT and PST are different, causing counter III to be reset to a value of 1 at T2 time and causing PST to be set to its OFF state at T3 time. Again, all further tests fail and no further operations are performed during this sample time.

The S3 sample now finds the received signal at its UP level, causing LBT 12 to be set to its ON state. This results in counter I being advanced to a count of 2, in counter III being reset to a count of 1 and in PST 30 being set to its ON state.

The S4 sample again finds the received signal at an UP level, causing LBT 12 to be set to its ON state. This results in counter I being advanced to a count of 3 and in counter III being advanced to a count of 2. All further tests fail and no further operations are performed during this sample cycle.

As indicated previously, a sample taken at a transition causes LBT 12 to be set to the value of the previous pulse rather than to the value of the new pulse. Therefore, the sample taken at S5 time causes LBT 12 to be set to its ON state. This causes counter I to be incremented to a count of 4 at T2 time and counter III to be incremented to a count of 3. Since CCT 50 is in its OFF state, when the couters are tested after T4 time, and it is found that counter I has a count of 4 therein, output signals are generated on lines 36 (FIG. 1) and 60 from logic box 18. At T5 time, the signal on line 36 fully conditions AND gate 22, allowing the contents of LBT 12, an ON level, to be applied through line 38 to PBT 40 and also causes this level to be stored in accumulator 42. The signal on line 60 is passed through AND gate 56 and line 52 to set CCT 50 to its ON state. Therefore, in spite of the fact that the first pulse is over 28% shorter than it should be and in addition has a noise spike in it, it has still been properly recognized.

At S6 time, there is a DOWN level on transmission line 10 and LBT 12 is therefore set to its OFF state. Since the sum of the counts in counters I and II is not equal to 7, these counters have not been reset. Therefore, prior to T2 time, a test indicates that counter I has a count of 4 therein and counter II is therefore incremented at T2 time from a count of 1 to a count of 2. Also, prior to T2 time, a test indicates that the contents of LBT 12 and PST 30 are different so that, at T2 time, counter III is reset to a count of 1. At T3 time, a signal appears on line 26 (FIG. 1) conditioning AND gate 20 to apply the contents of LBT 12 to PST 30. PST 30 is therefore set to its OFF state. After T4 time, counter I is tested and found equal to 4; but, since CCT is now in its ON state, no operations are performed at T5 time. Since the sum of the counts in counters I and II is only 6 during this sample cycle, counters I and II and CCT are not reset at T6 time.

At S7 time, transmission line 10 has a DOWN level on it so that LBT is again set to its OFF state. Since counter I still has a count of 4 in it, at T2 time counter II is advanced to a count of 3 and, since the previous sample was also a DOWN level, counter III is advanced to a count of 2. Since, counter III has only a count of 2 in it, no operation occurs at T3 time. However, when the sum of the counts in counters I and II are now tested prior to T6 time, it is found that they are equal to 7. Therefore, at T6 time, logic box 18 generates an output signal on line 68 causing counters I and II to be reset to a count of 0 and also generates an output signal on line 66 fully conditioning AND gate 62 to generate an output signal on line 54 resetting CCT 50 to its OFF state. It is therefore seen that the first data pulse cycle is ended two sample cycles into the second data pulse. It will be seen as the description of the operation progresses, that this causes no problem in properly detecting the data pulses applied to transmission line 10.

The sample taken at S8 time again causes LBT 12 to be set to its OFF state. Since neither counter now has a count of 4 in it, at T2 time counter II is advanced to a count of 1 and, since LBT is equal to PST, counter III is incremented to a count of 3. All further tests fail during this sample cycle and no further operations are performed.

At S9 time, LBT is again set to its OFF state at T1 time. This causes counter II to be incremented to a count of 2 at T2 time, and also causes counter III to be incremented to a count of 4. Between time 2 and time 3, counter III is tested and found to be equal to 4. Since CCT is in its OFF state, and LBT is not equal to PBT (LBT being in its OFF state and PBT in its ON state), at T3 time a signal is applied by logic box 18 to line 68 to reset counters I and II to 0. Since LBT is in its OFF state, at T4 time a signal is applied to line 86 to set counter II to a count of 4. Counter II is then tested and found to be equal to 4, and, since CCT is still in its OFF state, at T5 time signals are again applied to lines 36 and 60 by logic box 18. The signal on line 36 causes PBT 40 to be set to the state of LBT 12 (to its OFF state) and also causes the OFF level to be applied to the lowest-order position in accumulator 42, the remaining data in the accumulator being shifted left. Finally, the signal on line 60 is passed through AND gate 56 and line 52 to set CCT 50 to its ON state. The second data pulse is therefore properly recognized as a DOWN level.

At T1 time of the S10 sample cycle, LBT 12 is again set to its OFF state, the transition being sensed as the value of the pulse which is terminating. Since counter II has a count of 4 at this time, counter I is, at T2 time, incremented to a count of 1. CCT 50 being in its ON state, no further operations are performed during this sample cycle.

At S11 time, the signal on transmission line 10 has changed to an UP level and LBT is therefore set to its ON state at T1 time. Since counter II still has a count of 4 in it, counter I is advanced to a count of 2. Also, since LBT is not now equal to PST, counter III is reset to a count of 1 at T2 time and PST is set to the value of LBT, to its ON state, at T3 time. These are the only operations which are performed during the S11 sampling cycle.

At S12, T1 time, LBT is again set to its ON state and, since counter II is still equal to 4, counter I is, at T2 time, advanced to a count of 3. Since LBT is now equal to PST, counter III is, at this same time, advanced to a count of 2. Prior to T6 time, counters I and II are tested and their sum is now found equal to 7. Therefore, at T6 time, counters I and II are reset to a count of 0 in a manner previously described and CCT is reset to its OFF state. This terminates the data pulse cycle for the second data pulse. As before, this termination occurs two sample pulse times into the next data pulse. However, it can be seen that the circuit is no further off than it was at the end of the previous data pulse cycle, and it can also be seen that the operation of the circuit is such that even though the clocks remain out of phase with each other, the sampling pulses are no more than two sample pulses out of phase no mater how many data pulses are transmitted.

At the end of sample time 12, counter III has a count of 2 stored therein. This count is upped to a count of 3 during sample time 13 and to a count of 4 during sample time 14. The circuit therefore properly recognizes the third data pulse as an UP level during the fourteenth sample time and adjusts the counts in counters I and II in an attempt to resynchronize the transmitted and received signals.

The detection of succeeding pulses proceeds in a manner identical to that already described. While for the input signal shown on line *b* of FIG. 6, very little noise can be tolerated and still obtain accurate results, it should be remembered that in this example, the transmitter and receiver clocks are almost 30% out of phase. This is an enormous phase error, and is most unlikely to occur in any transmission system. The phase error usually encountered is around 2 or 3%.

Line *c* of FIG. 6 shows the received signal where, again, the transmitter and receiver clocks are about 30% out of phase, but now the transmitter clock is running slow. Looking at FIGS. 2 and 6, it is seen that the sample taken at S1 time causes counters I and III to be incremented to a count of 1. The samples taken at S2 and S3 time cause like incrementing of these two counters so that at the end of S3 time, counters I and III each have a count of 3 stored therein. The noise spike at S4 time causes a count of 1 to be added into counter II and causes counter III to be reset to a count of 1. At S5 time, the signal on the transmission line has returned to an UP level and counter I is therefore advanced to a count of 4 and counter III reset to a count of 1. The incrementing of counter I to a count of 4 causes, at T5 time, the setting of PBT to its ON state, the shifting of an ON level into accumulator 42, the remaining data in the accumulator being shifted left one position, and the setting of CCT to its ON state. The above operations result in the proper identification of the first data pulse as an UP level.

Since at S6, T2 time, counter I has a count of 4 stored therein, counter II is at this time, incremented to a count of 2 and counter III is likewise incremented to a count of 2. At S7 time, counter II and counter III are each incremented to a count of 3. Since the sum of the counts in counters I and II is now equal to 7, counters I and II are reset to a count of 0 and CCT is reset to its OFF state. This effectively terminates the first data pulse cycle. The first data pulse cycle is therefore terminated two sample cycles before the end of the first data pulse. However, as will be seen, this does not prevent the proper recognition of succeeding data pulses.

At S8 time, LBT is again set to its ON state, causing counter I to be incremented to a count of 1 and counter III to be incremented to a count of 4. Between T2 and T3 time of this sample cycle, counter III has a count of 4 stored therein and CCT is in its OFF state. However, both LBT and PBT are in their ON state. Therefore, the counters are not reset to 0 at T3 time nor is a count of 4 set into counter I at T4 time. At S9 time, counter I is incremented to a count of 2 and counter III to a count of 5. At S10 time, the signal on transmission line 10 has shifted to a DOWN level, causing LBT to be set to its OFF state. This causes counter II to be advanced to a count of 1 and causes counter III to be reset to a count of 1. During the sample cycles at S11 and S12 time, counters II and III are each incremented so that at the end of S12 time, counters II and III each have a count of 3 stored therein. At S13 time, counters II and III are each incremented to a count of 4. Between T2 and T3 time of the S13 sample cycle, counter III is found equal to 4, CCT is found to be in its OFF state, and LBT is found to be different from PBT. Therefore, at T3 time, counters I and II are reset to 0 and at T4 time, a count of 4 is set into counter II. The effect of this operation is to cancel the count of 2 which was previously stored in counter I. As a result, the data pulse cycle presently being performed is effectively started at S10 time, at the time that the first sample counted by counter III occurred. Since the first sample on the second data pulse did, in fact, occur at S10 time, the circuit is at this instant of time, properly synchronized. At T5 time of the S13 sample cycle, PBT is set to the value of LBT, to its OFF state, a DOWN level is shifted into the accumulator, and CCT is switched to its ON state. The circuit therefore properly recognizes the second data pulse as a DOWN level.

Since counter II has a count of 4 stored therein, during T2 time of the S14, S15, and S16 sample cycles, counter I is incremented from a count of 0 to a count of 3. Prior to T6 time of the S16 sample cycle, the sum of the counts in counters I and II is found equal to 7 and therefore, at T6 time of this sample cycle, counters I and II are reset to a count of 0 and CCT is reset to its OFF state. Therefore, the second data pulse cycle is terminated two sample cycles prior to the end of the second data pulse. It will be remembered that the first data pulse cycle also terminated two sample cycles early. Therefore, even though the transmitter and receiver clocks are almost 30% out of phase with each other, the circuit is maintaining a degree of synchronization.

During the S17 and S18 sample cycles, counters II and III are incremented to a count of 2. During the S19 sample cycle, counter I is incremented to a count of 1 and counter III is reset to a count of 1. During the S20, S21 and S22 sample cycles, counters I and III are incremented from a count of 1 to a count of 4. Therefore, after T2 time of the S22 sample cycle, counter III has a count of 4 stored therein, CCT is in its OFF state, and LBT is not equal to PBT. Counters I and II are therefore reset to 0 during T3 time of this sample cycle and during T4 time counter I is set equal to 4. This permits the third data pulse to be properly recognized as an UP level and causes the circuit to resynchronize. Succeeding data pulses on line *c* of FIG. 6 are recognized in the same manner as that described above for the first three data pulses.

DETAILED CIRCUIT DESCRIPTION

FIGS. 3A–3C form a detailed schematic diagram of a preferred embodiment of the circuit of this invention. Like elements have been given like numbers in FIGS. 1 and 3A–3C, and dashed boxes have been drawn around the circuitry for logic box 18 and decoder 78 in FIGS. 3B and 3C, respectively, to assist in correlating the two figures.

Referring now to FIG. 3A, it is seen that the data pulse on transmission line 10 are applied through voltage level setter 100 and line 102 to pulse driver 104. Level setter 100 is generally required to adjust the voltage swings of the transmitted signal to the voltage levels required to set the circuit triggers. Pulse driver 104 and the other pulse drivers in the device are AND gates of a type which generate an output in response to only the leading edge of the pulse which fully conditions them. These circuits therefore generate a voltage spike output which is ideally suited for setting a trigger and prevent certain timing problems which might occur if such pulses were not used for the setting of the triggers. Such a circuit may be formed by inserting a coil in series with at least one of the inputs to a conventional AND gate. Output line 106 from pulse driver 104 is connected to the ON side input of line bit trigger (LBT) 12. The other input to pulse driver 104 is T1 timing pulse line 108. Line 108 is one of seven outputs from clock 90. The other outputs from this clock are a T2 timing pulse line 109, a T3 timing pulse line 110, a T4 timing pulse line 111, a T5 timing pulse line 112, a T6 timing pulse line 113, and a T4–T6 timing pulse line 114.

T6 timing pulse line 113 is one input to pulse drivers 118 and 120. The other input to pulse driver 118 is a continuous UP level signal from hub 122 on line 123. Therefore, pulse driver 118 generates an output signal on line 124 to switch LBT 12 to its OFF state whenever a timing pulse is applied to line 113. Output line 16*a* from the ON side of LBT 12 is connected as the information input to AND gates 128, 130, 132, 134 (FIG. 3*B*), 136, 138, and 140. Output line 16*b* from the OFF side of LBT is connected as the information input to AND gates 144, 146, 148 (FIG. 3B), 150, 152 and 154.

Output line 67 from the OFF side of cycle control trigger (CCT) 50 is connected as one input to AND gates 158 (FIG. 3B) and 160.

Output line 32*a* from the ON side of past sample trigger (PST) 30 is connected as the second input to AND gate 136 (FIG. 3B). Output line 36*b* from the OFF side of PST 30 is connected as the second input to AND gate 150 (FIG. 3B). Output lines 166 and 168 from AND gates 136 and 150, respectively, are connected as the inputs to OR gate 170. Output line 172 from OR gate 170 is connected as the conditioning input to pulse driver 174 (FIG. 3C). As will be seen, this is the advance line out of the logic box for counter III. The other input to pulse driver 174 is T2 timing pulse line 109. Line 109 is also connected as one input to pulse drivers 176, 180 and 184. Output line 188 from pulse driver 174 is the advance line for counter III 84.

Output line 172 from OR gate 170 (FIG. 3B) is also connected to the input to inverter 190. Output line 192 from inverter 190 divides to form line 194 and line 26. Line 194 is connected as the second input to pulse driver 176 (FIG. 3C). Output line 196 from pulse driver 176 is connected to counter III in a manner to cause this counter to be set to a count of 1. Line 194 is therefore the reset-counter III-to-1 output line from logic box 18.

Line 26 is connected as the conditioning input to pulse driver 186 (FIG. 3A). The other input to this pulse driver is T3 line 110. Output line 198 from pulse driver 186 is connected as the conditioning input to AND gates 130 and 144. Output line 200 from AND gate 130 is connected to the ON-side input of PST 30, while output line 202 from AND gate 144 is connected to the OFF-side input of this trigger. Line 26 is therefore the set-PST-to-value-of-LBT output from logic box 18.

Output line 44*a* from the ON-side of past bit trigger (PBT) 40 is connected as the second input to AND gate 152 (FIG. 3B). Output line 44*b* from the OFF-side of PBT 40 is connected as the second input to AND gate 138. Output lines 210 and 212 from AND gates 138 and 152, respectively, are connected as the inputs to OR gate 214. Output line 216 from OR gate 214 is connected as a second input to AND gate 158. The third input to AND gate 158 is output line 88 from the ON-side of 4-trigger 218 (FIG. 3C) of counter III. It can be seen that AND gates 138 and 152 and OR gate 214 form an exclusive OR gate which generates an output when PBT and LBT are not equal. Therefore, AND gate 158 generates an output signal on line 220 when CCT 50 is in its OFF state, counter III has a count of 4 therein, and LBT is not equal to PBT. It will be remembered from FIG. 2A that these are the three conditions for initiating a resynchronization operation.

Output line 220 from AND gate 158 is connected as the second input to AND gates 140 and 154 and as one input to OR gate 222. Output line 224 from AND gate 140 is connected as a conditioning input to pulse driver 226 (FIG. 3C). Output line 228 from AND gate 154 is connected as the conditioning input to pulse driver 230. The other input to pulse drivers 226 and 230 is T4 pulse line 111. Output line 232 from pulse driver 226 is connected to set a count of 4 into counter I and output line 234 from pulse driver 230 is connected to set a count 4 into counter II.

Output line 236 from the ON side of 1-trigger 238 of counter I is connected as one input to AND gate 240. Output line 242 from the ON side of 2-trigger 244 of counter I is connected as a second input to AND gate 240. It should be noted that an output will occur simultaneously on lines 236 and 242 when counter I has a count of 3 stored therein. A third input to AND gate 240 is output line 246 from the ON side of 4-trigger 248 of counter II. AND gate 240 is therefore conditioned to generate an output signal on line 250 when counter I has a count of 3 therein and counter II has a count of 4. Output lines 252 and 254 from the ON sides of 1-trigger 256 and 2-trigger 258, respectively, of counter II are connected as two inputs to AND gate 260. A third input to this AND gate is output line 262 from 4-trigger 264 of counter I. AND gate 260 is therefore conditioned to generate a signal on line 266 when counter II has a count of 3 stored therein and counter I a count of 4. The final input to AND gates 240 and 260 is T4–T6 timing line 114. Lines 250 and 266 are connected as the inputs to OR gate 268.

Output line 270 from OR gate 268 therefore has a signal on it when the sum of the counts in counters I and II is equal to 7. Line 270 divides into line 272 which is connected as the second input to OR gate 222 (FIG. 3B) and line 66, which is connected as the conditioning input to pulse driver 120 (FIG. 3A). Output line 68 from OR gate 222 is connected as the conditioning input to pulse driver 274 (FIG. 3C). The other input to pulse driver 274 is output line 276 from OR gate 278. The inputs to OR gate 278 are T3 line 110 and T6 line 113. Output line 280 from pulse driver 274 is connected to reset all the triggers in counters I and II to their OFF state, or in other words, to reset counters I and II to a count of 0.

Output line 282 from pulse driver 120 (FIG. 3A) is connected to the OFF-side input of CCT 50. As previously indicated, the inputs to pulse driver 120 are line 66 and T6 line 113.

In addition to being connected as one input to AND gate 240, output line 246 from the ON side of 4-trigger 248 (FIG. 3C) of counter II is also connected as one input to OR gates 284 and 286 (FIG. 3B). In addition to being connected as one input to AND gate 260, output line 262 from the ON side of 4-trigger 264 of counter I is connected as the second input to OR gate 284 and as one input to OR gate 288 (FIG. 3B). OR gate 284 therefore generates an output signal on line 290 when either counter I or counter II has a count of 4 therein. Line 290 is connected as the second input to AND gate 160 (FIG. 3B). Output line 292 from AND gate 160 divides to form lines 36 and 60. Line 36 is connected as the conditioning input to pulse driver 294 (FIG. 3A). Line 60 is connected as the conditioning input to pulse driver 296. The other input to pulse drivers 294 and 296 is T5 line 112. Output line 298 from pulse driver 296 is connected to the ON side input of CCT 50. Output line 300 from pulse driver 294 is connected as one input to AND gates 128, 132, and 146, and as the shift pulse for data shift accumulator 42. Output line 302 from AND gate 128 is connected to apply new data to data shift accumulator 42. As in FIG. 1, the information in data shift accumulator 42 is applied through lines 46 to decoder 48. Decoder 48 gives an indication on output lines 49 of the information represented by the coded bits in the accumulator. Output line 304 from AND gate 132 is connected to the ON-side input of PBT 40 while output line 306 from AND gate 146 is connected to the OFF-side input of this trigger.

Output line 308 from the OFF-side of 4-trigger 264 (FIG. 3C) of counter I is connected as one input to AND gate 310 (FIG. 3B). Output line 312 from the OFF side of 4-trigger 248 of counter II is connected as the other input to AND gate 310. Output line 314 from AND gate 310 is connected as the second input to AND gates 134 and 148. Output line 316 from AND gate 134 is connected as the other input to OR gate 286 and output line 318 from AND gate 148 is connected as the other input to OR gate 288. Output line 320 from OR gate 286 is connected as a conditioning input to pulse driver 184 (FIG. 3C). Output line 322 from pulse driver 184 is connected as the advance input to counter I. Output line 324 from OR gate 288 (FIG. 3B) is connected as the conditioning input to pulse driver 180 (FIG. 3C). Output line 326 from pulse driver 180 is connected as the advance input to counter II.

The triggers in counters I, II, and III may be interconnected in any standard fashion to give the desired results. To simplify the drawing, these interconnections have not been shown but have been represented schematically by dotted lines between the triggers. While advance lines have been shown as being applied to the counters, it is to be understood that these lines are in fact, applied to interconnecting gates in the counters.

CLOCK CIRCUIT

Before describing the operation of the embodiment of the invention shown in FIGS. 3A–3C, a clock circuit suitable for use as the clock circuit 90 shown in FIGS. 1 and 3B will be described. Referring to FIG. 4, it is seen that the clock consists of an oscillator I, also designated 350, and an oscillator II, also designated 352. Referring to FIG. 5, it is seen that the frequency of oscillator I is seven times the data frequency and that the frequency of oscillator II is much greater than the frequency of oscillator I. For the particular circuit shown, the frequency of oscillator II should be at least seven times that of oscillator I. The output from oscillator I is applied through line 354 to one input of pulse driver 356. The other input to pulse driver 356 is line 358 which has a continuous UP level applied to it by hub 359. Therefore, pulse driver 356 generates a pulse spike at the beginning of each output pulse from oscillator 350. The pulse on output line 360 from pulse driver 356 is applied to the ON-side input of run trigger 362. Output line 364 from the ON side of run trigger 362 is connected as one input to pulse driver 366. The other input to pulse driver 366 is output line 368 from oscillator 352. Pulse driver 366 therefore generates a pulse spike on output line 370 at the beginning of each pulse out of oscillator 352 if, at the same time, run trigger 362 is in its ON state. Line 370 is connected as one input to AND gates 372, 374, 376, 378, 380, 382, 384, 386, and 388. Output line 390 from AND gate 372 is connected to the OFF-side input of run trigger 362. Since the other input to AND gate 372 is T6 line 113, this means that the run trigger is turned off by the first pulse spike out of pulse driver 366 during T6 time.

Output lines 392, 394, 396, and 398 from AND gates 374, 378, 382, and 386, respectively, are connected to the ON-side inputs of triggers 401–404, respectively. Output lines 406, 408, 410 and 412, from AND gates 376, 380, 384, and 388, respectively, are connected to the OFF-side inputs of triggers 401–404, respectively. Output line 414 from the ON side of trigger 401 is connected as the second input to AND gate 378 and as one input to AND gates 416 and 418. Output line 420 from the ON-side of trigger 402 is connected as the second input to AND gate 382 and as one input to AND gates 422 and 424. Output line 426 from the ON-side of trigger 403 is connected as the second input to AND gates 376, 386, and 418 and as one input to AND gate 428. Output line 114 from the ON side of trigger 404 is connected as one input to AND gate 432 and as the T4–T6 output line from clock 90. Output line 434 from the OFF side of trigger 401 is connected as a second input to AND gates 380 and 424. Output line 436 from the OFF side of trigger 402 is connected as the second input to AND gates 384, 416, and 428. Output line 438 from the OFF side of trigger 403 is connected as the second input to AND gates 374, 388, 422 and 432. The output lines from AND gates 416, 422, 418, 424, 428, and 432 are the T1–T6 lines 108–113, respectively.

FIG. 5 is a timing chart showing how the desired sequence of timing pulses is obtained from the circuit shown in FIG. 4. Once run trigger 362 has been switched to its ON state by the leading edge of the pulse out of oscillator I, the leading edge of each pulse out of oscillator II causes a stepping pulse to be applied to line 370. The triggers 401–404 are interconnected so that trigger 401 is turned on first and the remaining triggers are turned on in succession by succeeding pulses applied to line 370 with the pulse which turns on trigger 404 also being used to turn off trigger 401. Succeeding pulses on line 370 then turn off the triggers in succession with the pulse which turns off trigger 404 being used to turn on trigger 401 again. The outputs from these triggers are then suitably ANDed to give the desired pulse train. The pulse on line 370 which turns off trigger 404 thereby terminating the T6 pulse on line 113 is also passed through conditioned AND gate 372 to switch run trigger 362 to its OFF state. No further pulses are then applied to line 370 until a new pulse starts on line 354 from oscillator 350. Since there are seven pulses from oscillator I for each data pulse, there will be seven sample pulse cycles for each data pulse.

DETAILED DESCRIPTION OF OPERATION

To illustrate the operation of the circuit shown in FIGS. 3A–3C, assume that the transmitter clock is running almost 30% faster than the receiver clock so that, with a desired signal such as that shown on line *a* of FIG. 6, the received signal is in the form shown on line *b* of FIG. 6. Since the logic employed in the circuits in FIG. 1 and FIGS. 3A–3C, is identical, the flow chart of FIGS. 2A–2B applies to both circuits. Therefore, reference may be had to the flow chart of FIGS. 2A–2B to assist in following the description to follow of the operation of the circuit of FIGS. 3A–3C.

Referring to FIG. 3A, the UP level on transmission line 10 at the beginning of the S1 sample cycle, is applied through voltage level setter 100 and line 102 to one input pulse driver 104. When the T1 timing pulse is applied to line 108, pulse driver 104 applies a pulse spike through line 106 to set LBT 12 to its ON state. Since neither counter I nor counter II has a count of 4 in it at this time, signals appear on lines 308 and 312 fully conditioning AND gate 310 (FIG. 3B) to generate an output signal on line 314 which is applied to condition AND gate 134. Since there is a signal on output line 16*a* from the ON side of LBT, AND gate 134 generates an output signal at this time on line 316 which is applied through OR gate 286 to line 320. The signal on line 320 is applied to condition pulse driver 184 (FIG. 3C). At T2 time, a signal appears on line 109, fully conditioning pulse driver 184 to generate a pulse spike on line 322, which increments counter I to a count of 1.

Since PST 30 (FIG. 3A) is in its OFF state at this time, a signal appears on output line 32*b* to partially condition AND gate 150 (FIG. 3B). Also, since LBT 12 is in its ON state, a signal appears on line 16*a* to partially condition AND gate 136. Since neither AND gate 136 or 150 is fully conditioned at this time, there is no output from OR gate 170 on line 172 and inverter 190 therefore generates an output signal on line 192, which is applied through line 26 to condition pulse driver 186 (FIG. 3A) and through line 194 to condition pulse driver 176 (FIG. 3C). At T2 a pulse is applied to line 109 causing pulse driver 176 to be fully conditioned to generate an output spike on line 196, which spike is applied to counter III to set this counter to a count of 1. At T3 time a signal is applied to line 110 fully conditioning pulse driver 186 to generate a spike on line 198 which fully conditions AND gate 130 to apply a signal through line 200 to switch PST 30 to its ON state. As indicated previously, all other tests fail during this sample cycle and therefore no further operations are performed until T6 time when a signal is applied through conditioned pulse driver 118 (FIG. 3A) and line 124 to reset LBT 12 to its OFF state.

At S2 time, a noise spike has caused the level on transmission line 10 to drop to a DOWN level. Any variation in this level from the standard is compensated for in level setter 100. Therefore, the T1 timing pulse applied to line 108 finds pulse driver 104 deconditioned and LBT 12 left in its OFF state. Since neither counter I nor counter II has a count of 4 in it at this time, signals still appear on lines 308 and 312, which are passed through AND gate 310 (FIG. 3B) and line 314 to conditioned AND gate 148. Since LBT 12 is in its OFF state, there is a signal on OFF-side output line 16*b* which fully conditions AND gate 148 to generate an output signal on line 318, which is pasesd through OR gate 288 and line 324 to condition pulse driver 180 (FIG. 3C). At T2 time, a signal appears on line 109 the leading edge of which is passed through conditioned pulse driver 180 and line 326 to increment counter II to a count of 1.

Also, since PST 30 is in its ON state, there is a signal on line 32*a* which is applied to partially condition AND gate 136 (FIG. 3B). The signal on line 16*b* partially conditions AND gate 150. Therefore, neither AND gate is fully conditioned, and OR gate 170 does not generate an output signal on line 172. Inverter 190 therefore generates an output signal on line 192, which is applied to lines 26 and 194. As indicated previously, this causes counter III to be reset to a count of 1 at T2 time and causes the contents of LBT to be read into PST at T3 time. No further operations are performed during this cycle, until T6 time when a signal is applied to line 113 to energize pulse driver 118 (FIG. 3A). This causes a signal to be applied to line 124 to reset LBT 112 to its OFF state. LBT being in its OFF state at this time, this pulse is, of course, ineffective.

At S3 time, transmission line 10 has returned to an UP level and a sequence of operations occur which is identical to that described for S1 time, the only difference being that now, when counter I is incremented, it contains a count of 2.

At S4 time, transmission line 10 is still at its UP level, causing LBT 12 to be switched to its ON state at T1 time. Since neither counter I nor counter II has a count of 4 in it at this time, counter I is incremented to a count of 3 in a manner previously decribed. Since PST 30 is in its ON state at this time, there is a signal on line 32*a* which is applied as one conditioning input to AND gate 136 (FIG. 3B), the other conditioning input to this AND gate being the signal on output line 16*a* from the ON side of LBT 12. AND gate 136 is therefore fully conditioned at this time, generating an output signal on line 166, which is applied through OR gate 170 and line 172 to condition pulse driver 174 (FIG. 3C). At T2 time, the leading edge of the timing pulse on line 109 is applied by pulse driver 174, to line 188, causing counter III to be incremented to a count of 2. No further operations are performed during this sample cycle until T6 time when a signal is applied through line 113 and conditioned pulse driver 118 to line 124 to reset LBT 12 to its OFF state.

At S5 time, the received signal on transmission line 10 is interpreted as an UP level, causing LBT 12 to be set to its ON state at T1 time. This causes counters I and III to be incremented in a manner previously described, leaving counter I with a count of 4 in it and counter III with a count of 3. Counter I having a count of 4 therein, causes an output signal to appear on output line 262 from the ON side of 4-trigger 264 (FIG. 3C). The level on line 262 is applied through OR gate 284 and line 290 to one input of AND gate 160 (FIG. 3B). Since CCT 50 is in its OFF state, there is a signal on line 67 at this time, which fully conditions AND gate 160 to generate an output signal on line 292 which signal is applied to lines 36 and 60. The signal on line 36 is applied to condition pulse driver 294 (FIG. 3A), and the signal on line 60 is applied to condition pulse driver 296. At T5 time, a signal appears on line 112 to fully condition pulse drivers 294 and 296. The output signal on line 298 from pulse driver 296 switches CCT 50 to its ON state. The output spike from pulse driver 294 on line 300 is applied through conditioned AND gate 132 and line 304 to switch PBT 40 to its ON state, and through conditioned AND gate 128 and line 302 to cause an ON level to be read into data shift accumulator 42. The signal on line 300 also causes the contents of data shift accumulator 42 to be shifted left one position. The first data pulse is in this way properly recognized as an UP level. At T6 time of this data sample cycle, LBT 12 is reset to its OFF state.

At S6 time, there is a DOWN level on a transmission line 10 causing pulse driver 104 to be deconditioned at T1 time. LBT 12 therefore remains in its OFF state. Since counter I has a count of 4 in it, there is a signal on output line 262 from the ON side of 4-trigger 264 of counter I. This signal is applied through OR gate 288 (FIG. 3B) and line 324 to condition pulse driver 180 (FIG. 3C). It should be noted that since there is a count of 4 in counter I, there is no signal on line 308 at this time, thereby deconditioning AND gate 310 (FIG. 3B), and preventing the application of a signal to line 314. The advance pulse on line 324 for counter II must therefore be derived from line 262. At T2 time, a signal is applied to line 109 fully conditioning pulse driver 180 to generate an advance spike for counter II, thereby incrementing this counter to a count of 2.

PST is at this time in its ON state, and there is therefore an output signal on line **32*a* which is applied to partially condition AND gate 136. The output signal on line 16*b* from the OFF side of LBT 12 partially conditions AND gate 150. Since neither of these AND gates is fully conditioned, there is no output signal on line 172 from OR gate 170 and inverter 190 therefore applies a signal to line 192** to cause counter III to be reset to a count of 1 at T2 time and to cause PST to be reset to its OFF state, to the state of LBT, at T3 time. These two operations occur in a manner previously described. No further operations occur during the S6 sample cycle until T6 time when a timing pulse is applied to attempt to reset LBT to its OFF state.

During time T1 of the S7 sample cycle, LBT 12 is left in its OFF state and during T2 time of this sample cycle, counter II is incremented to a count of 3 and counter III to a count of 2 in a manner previously described. At this time, counter I has a count of 4 in it causing trigger 264 to be in its ON state, and counter II has a count of 3 in it, causing triggers 256 and 258 to be in their ON states. This results in output signals on line 262, 252, and 254 ,which partially condition AND gate 260. During times T4–T6, a signal appears on line 114 from clock 90 fully conditioning AND gate 260 to generate an output signal on line 266, which is passed through OR gate 268 and line 270 to lines 66 and 272.

The signal on line 272 is applied through OR gate 222 (FIG. 3B) and line 68 as the conditioning input to pulse driver 274 (FIG. 3C). At T6 time clock 90 applies a signal to line 113 which is applied through OR gate 278 and line 276 as the other input to pulse driver 274. The resulting pulse spike out of pulse driver 274 on line 280 is applied to the OFF-side input of each of the counter I and counter II triggers to reset both of these counters to a count of 0. The signal on line 66 is applied to condition pulse driver 120 (FIG. 3A). The signal on line 113 at time 6 is also applied to fully condition this pulse driver, causing a pulse spike on line 282 which is applied to reset CCT 50 to its OFF state. The resetting of CCT and of counters I and II serves to terminate the first data pulse cycle. It is noted that the first data pulse cycle is terminated two sample pulse times after the end of the first data pulse. However, as was indicated previously, the circuit is designed to compensate for this error and to thereby allow the circuit to accurately determine the value of succeeding data pulses without requiring the resynchronization of the transmitter and receiver clocks.

At T1 of the S8 sample cycle, transmission line 10 is still at a DOWN level, causing LBT 12 to remain in its OFF state. At T2 time of this cycle, counter II is set to a count of 1 and counter III to a count of 3, in a manner previously described.

At T1 time of the S9 sample cycle, transmission line 10 still has a DOWN level on it and LBT 12 therefore remains in its OFF state. At T2 time of this sample cycle, counter II is incremented to a count of 2 and counter III to a count of 4. The incrementing of counter III to a count of 4 causes trigger 218 of this counter to be switched to its ON state. The resulting output signal on line 88 is applied as one input to AND gate 158 (FIG. 3B). Since CCT 50 is in its OFF state at this time, there is a signal on output line 67 from the OFF side of this trigger, this signal being the second conditioning input to AND gate 158. Also, since PBT 40 is in its ON state, and LBT 12 is in its OFF state, there are signals on lines **44*a* and 16*b* fully conditioning AND gate 152 to apply a signal through line 212, OR gate 214, and line 216 to the third input of AND gate 158. AND gate 158 is therefore fully conditioned to generate an output signal on line 220 which is applied as a conditioning input to AND gate 154 and through OR gate 222 and line 68 as a conditioning input to pulse driver 274 (FIG. 3C). At T3, clock 90 generates a signal on line 110, which is applied through OR gate 278 and line 276 to fully condition pulse driver 274 to generate a pulse spike on line 280, which is applied to reset counters I and II to a count of 0. The signal on output line 16*b* from the OFF side of LBT 12 is applied to fully conditioned AND gate 154 (FIG. 3B). The resulting output signal on line 228 is applied to condition pulse driver 230 (FIG. 3C). At T4 time, clock 90 generates a signal on line 111, which is applied to fully condition pulse driver 230 to generate a pulse spike on line 234** which is applied to set counter II to a count of 4.

Counter II having a count of 4 therein, causes an output signal to appear on line 246 from the ON side of 4-trigger 248 of counter II. This signal is applied through OR gate 284 and line 290 to one input of AND gate 160 (FIG. 3B). Since CCT 50 is in its OFF state at this time, there is a signal on line 67 which fully conditions AND gate 160 to generate an output signal on line 292 which signal is applied to lines 36 and 60. The signal on line 36 is applied as the conditioning input to pulse driver 294 (FIG. 3A) and the signal on line 60 is applied as the conditioning input to pulse driver 296. At T5 time, clock 90 applies a signal to line 112 which fully conditions pulse driver 294 to generate an output spike on line 300 and fully conditions pulse driver 296 to generate an output spike on line 298. The output spike on line 298 is applied to switch CCT 50 to its ON state. The output spike on line 300 is applied to condition AND gate 146 to pass the signal on line **16*b* through line 306 to switch PBT 40** to its OFF state. The spike on line 300 is also applied to shift the data in data shift accumulator 42 one position to the left and to condition AND gate 128. Since there is no signal on line 16*a* at this time, AND gate 128 is not fully conditioned and nothing is placed in the lowest-order position in data shift accumulator 42. The result of the above operation is to correctly indicate that the second data pulse is a DOWN level, and to adjust the circuit to indicate that the first sample on the second data pulse was taken at S6 time.

The circuit operates in the manner indicated above to properly distinguish the remaining pulses in the pulse train. The manner in which the circuit would operate to properly identify pulses in the pulse train shown on line *c* of FIG. 6 may easily be deduced from the above description of the operation with respect to the pulse train shown on line *b* of this figure, and from the description of the detection of this pulse train in the general description section.

While in the discussion so far there have been seven sample cycles for each data pulse cycle, this is by no means a limitation on the invention. As the number of sample cycles per data pulse cycle increases, the ability of the circuit to give accurate results with higher percentages of noise and phase error in the received signals increases, and conversely, as the number of sample cycles per data pulse cycle decreases, the amount of noise and phase error which can be tolerated, decreases. With seven sample cycles per data pulse cycle, a theoretical maximum of almost 43% noise can be tolerated while still obtaining accurate results. Increasing the number of sample cycles per data pulse cycle to eleven, would only increase the theoretical maximum tolerable error to a little over 45% while decreasing the number of sample cycles per data pulse cycle to five, would drop the theoretical maximum tolerable noise to 40%. The theoretical maximum tolerable noise approaches 50% as the number of sample pulse cycles per data pulse cycle increases. The selection of the exact number of sample pulse cycles per data pulse cycle therefore involves a trade-off by the circuit designer between the cost of added components and counter size versus the amount of accuracy required. Five or seven sample cycles per data pulse cycle give satisfactory results in most applications.

In the figure, the circuit has been shown as receiving information from a single transmitting station. It is however, possible, since the circuit components and oscillators I and II (FIG. 4) are capable of operation at a much higher frequency than the data pulse frequency, to multiplex the signals from several transmitters through the circuit of this invention.

Also, while in the illustrative examples described above, the pulses have been shown as coming in with alternate UP and DOWN levels, it is apparent that with the normal phase error between the clocks of a few percentage points, the circuit would give accurate results with long strings of UP and DOWN levels, as well as with the alternate UP-DOWN levels as shown in the examples.

Finally, the circuit may, with obvious modifications, be made to detect and compensate for errors with multilevel input signals as well as with the binary input signal shown for the preferred embodiment. With such a device, the value of some predetermined fraction of the samples, the predetermined fraction being less than a majority, may be accepted as the value of the received pulse.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A device for determining the value of each pulse in a train of received data pulses where the clocks at the data transmitter and at the data receiver may be out of synchronism comprising:

- means for sampling said pulses, said sampling means attempting to sample each of said pulses a predetermined number of times;
- means for indicating that the value of a data pulse has been determined;
- means responsive to an indication that a predetermined fraction of the samples on a given pulse are of like value for indicating that the value of the pulse is that of the predetermined fraction of the samples and for setting said value determined means;
- means for resetting said value determined means when the equivalent of said predetermined number of samples has been taken on a pulse;
- means for counting the number of consecutive like samples;
- and means responsive to the counting by said consecutive sample counting means when said value determined means is reset of a number of consecutive like samples equal to said predetermined fraction of the samples, said consecutive samples being of a value different from that stored in said indicating means, for indicating that the value of the next pulse in the train is that of the detected consecutive like samples and for indicating that the number of consecutive like samples have been taken on said next pulse.

2. A device for determining the value of each pulse in a train of received data pulses where the clocks at the data transmitter and at the data receiver may be out of synchronization comprising:

- means for sampling said pulses, said sampling means attempting to sample each pulse $(2n+1)$ times;
- means for indicating that the value of a data pulse has been determined;
- means responsive to $(n+1)$ samples of like value for a given pulse for indicating that the value of the pulse is that of the $(n+1)$ samples, and for setting said value determined means;
- means for resetting said value determined means when the equivalent of $(2n+1)$ samples have been taken on a pulse;
- means for counting the number of consecutive like samples;
- and means responsive to the counting of $(n+1)$ consecutive like samples by said consecutive sample counting means of a value different from that stored in said indicating means and to said value determined means being reset, for indicating that the value of the next pulse in the train is that of the $(n+1)$ consecutive like samples and for indicating that the $(n+1)$ samples have been taken on said next pulse.

3. A device for determining the value of each pulse in a train of received data pulses when the clocks at the data transmitter and the data receiver may be out of synchronism comprising:

- means for sampling said pulses, said sampling means attempting to sample each pulse $(2n+1)$ times;
- means for indicating that the value of each data pulse has been determined;
- a plurality of counting means, one for each of the possible values of said data pulses;
- means responsive to a data pulse being at a given value when it is sampled for incrementing the counter corresponding to that value;
- means responsive to one of said counting means being incremented to a count of $(n+1)$ for indicating that the value corresponding to that counter is that of the data pulse being sampled and for setting said value determined means;
- means for counting the number of consecutive like samples;
- and means responsive to the counting by said consecutive sample counting means of $(n+1)$ consecutive like samples of a value different from that stored in said indicating means and said value determined means being reset for indicating that the value of the next pulse in the train is that of the $(n+1)$ consecutive like samples, and for indicating that $(n+1)$ samples have been taken on said next pulse.

4. A device for determining the value of each pulse in a train of received data pulses where the clocks at the data transmitter and at the data receiver may be out of synchronism comprising:

means for sampling said pulses, said sampling means attempting to sample each pulse $(2n+1)$ times;

means for indicating that the value of a data pulse has been determined;

means for counting the number of samples at which the sampled data pulse is at an UP level;

means for counting the number of samples at which said data pulse is at a DOWN level;

means responsive to one of said counting means being incremented to a count of $(n+1)$ for indicating that the value of the pulse being sampled is that represented by the counting means which is incremented to a count of $(n+1)$ and for setting said value determined means;

means for resetting said value determined means when the equivalent of $(2n+1)$ samples have been taken on a pulse;

means for counting the number of consecutive like samples;

and means responsive to the counting of $(n+1)$ consecutive like samples by said consecutive sample counting means of a value different from that stored in said indicating means and to said value determined means being reset for indicating that the value of the next pulse in the train is that of the $(n+1)$ consecutive like samples and for indicating that $(n+1)$ samples have been taken on said next pulse.

5. A device for determining the value of each pulse in a train of received data pulses where the clocks at the data transmitter and at the data receiver may be out of synchronism comprising:

means for sampling said pulses, said sampling means attempting to sample each pulse $(2n+1)$ times;

means for storing the value of said pulse detected by said sampling means;

means for storing the value of said pulse detected by said sampling means during the preceding sample;

means for storing the value of a detected data pulse;

means for indicating that the value of a data pulse has been determined;

means for counting the number of times that said sample storing means is set to an UP level;

means for counting the number of times that said sample storing means is set to a DOWN level;

means responsive to one of said counting means being incremented to a count of $(n+1)$ for setting the value in said sample storing means into said pulse value storing means and for setting said value determined means;

means for resetting said counting means to a count of 0 and for resetting said value determined means when the equivalent of $(2n+1)$ samples have been taken on a pulse;

means for counting the number of consecutive like samples;

means for comparing the value in said sample storing means with the value in said past sample storing means;

means responsive to a mismatch in said comparing means for resetting said consecutive sample counting means to a count of 1 and for setting said past sample storing means to the value of said sample storing means;

means responsive to an indication from said comparing means that said sample storing means and said past sample storing means are of the same value for incrementing said consecutive sample counting means and for testing the count in said consecutive sample counting means to determine if it is equal to $(n+1)$;

and means responsive to said value-determined indicating means being reset, to the value in said sample storing means and said past-pulse-value storing means not being equal, and to the above-mentioned test of said consecutive sample counting means indicating that there is a count of $(n+1)$ in said consecutive sample counting means for resetting said UP level and DOWN level counting means to a count of 0 and for then setting a count of $(n+1)$ into the counting means corresponding to the setting of said sample storing means.

6. A device for determining the value of each pulse in a train of received data pulses where the clocks at the data transmitter and at the data receiver may be out of synchronism comprising:

means for performing sample cycles on said received pulses, said means attempting to perform $(2n+1)$ sample cycles on each of said received pulses;

means operable at the beginning of each sample cycle for storing the value of the received pulse being sampled;

means for storing the value in said sample storing means during the preceding sample cycle;

means for storing the value of the preceding data pulse;

means for indicating that the value of a pulse has been determined;

means for counting the number of sample cycles at which said pulse being sampled is at an UP level;

means for counting the number of sample cycles at which the pulse being sampled is at a DOWN level;

means for counting the number of consecutive like samples;

first means operable after said storing means is set for detecting if either said UP-level or said DOWN-level counting means has a count of $(n+1)$ in it;

means responsive to an indication from said detecting means that neither said UP-level nor said DOWN-level counting means has a count of $(n+1)$ in it for incrementing the counting means corresponding to the setting of said sample storing means;

means responsive to an indication from said detecting means that either said UP-level or said DOWN-level counting means has a count of $(n+1)$ therein for incrementing the other of said level counting means;

second means operable after said sample storing means is set for testing to determine if the value in said sample storing means is equal to the value in said past-sample storing means;

means responsive to an indication that said storing means are not equal for resetting said consecutive sample counting means to a count of 1 and for setting the value in said sample storing means into said past-sample storing means;

means responsive to an indication that said sample storing means and said past sample storing means have the same value therein for incrementing the count in said consecutive sample counting means and for testing to determine if the count in said consecutive sample counting means is equal to $(n+1)$;

means responsive to said test indicating a count of $(n+1)$ in said consecutive sample counting means, to said value determined means being reset, and to the value in said sample storing means not being equal to the value in said past-pulse-value storing means for resetting the count in said level counting means to 0 and for then setting the level counting means for counting the value in said sample storing means to a count of $(n+1)$;

second level-counter-detector means, including in part said first level-counter-detection means, operable after said above described means for detecting if either of said level counting means have a count of $(n+1)$ therein;

means responsive to an indication from said second level-counter-detector means that one of said counters has a count of $(n+1)$ therein for setting the value in said sample storing means into said pulse-value storing means and for setting said value determined means;

means operable after said last-mentioned means for detecting whether the sum of the counts in said level counting means is equal to $(2n+1)$;

and means operable in response to an indication from said sum indicating means that the sum of said counts is equal to $(2n+1)$ for resetting said level counting means to a count of 0 and for resetting said value determined means.

References Cited

UNITED STATES PATENTS

| | | | |
|---|---|---|---|
| 2,813,149 | 11/1957 | Cory | 340—146.3 |
| 3,134,032 | 5/1964 | Mann | 307—88.5 |
| 3,159,811 | 12/1964 | James et al. | 340—146.1 |
| 2,926,848 | 3/1960 | Gordon | 235—150.3 |
| 2,927,207 | 3/1960 | Fiehrer et al | 328—151 |

MALCOLM A. MORRISON, Primary Examiner

CHARLES T. ATKINSON, Assistant Examiner

U.S. Cl. X.R.

328—151